(12) United States Patent
Nolen et al.

(10) Patent No.: US 9,044,722 B2
(45) Date of Patent: Jun. 2, 2015

(54) MULTI-COMPONENT, TEMPERATURE ACTIVATED, TISSUE ADHESIVE, SEALING, AND FILLING COMPOSITION

(76) Inventors: Darren Edward Nolen, Atlanta, GA (US); Jennifer Lynne Nolen, Atlanta, GA (US)

(*) Notice: Subject to any disclaimer, the term of this patent is extended or adjusted under 35 U.S.C. 154(b) by 613 days.

(21) Appl. No.: 13/293,312

(22) Filed: Nov. 10, 2011

(65) Prior Publication Data
US 2012/0111229 A1 May 10, 2012

Related U.S. Application Data

(60) Provisional application No. 61/412,367, filed on Nov. 10, 2010.

(51) Int. Cl.
| | |
|---|---|
| *A61L 12/14* | (2006.01) |
| *B01J 4/00* | (2006.01) |
| *C09J 105/00* | (2006.01) |
| *C09J 105/04* | (2006.01) |
| *C09J 105/08* | (2006.01) |
| *C09J 189/00* | (2006.01) |
| *C08L 5/00* | (2006.01) |

(Continued)

(52) U.S. Cl.
CPC ............... *B01J 4/002* (2013.01); *C09J 105/00* (2013.01); *C09J 105/04* (2013.01); *C09J 105/08* (2013.01); *C09J 189/00* (2013.01); *C08L 5/00* (2013.01); *C09J 189/06* (2013.01); *C08L 5/04* (2013.01); *C08L 5/08* (2013.01); *C08L 89/00* (2013.01); *C08L 89/06* (2013.01); *C08J 3/241* (2013.01); *C08J 2305/04* (2013.01); *C08J 2389/00* (2013.01); *C08J 2389/06* (2013.01); *B01J 4/004* (2013.01); *B01J 2219/00126* (2013.01)

(58) Field of Classification Search
USPC ....................................................... 106/148.5
See application file for complete search history.

(56) References Cited

U.S. PATENT DOCUMENTS

| | | |
|---|---|---|
| 3,505,428 A | 4/1970 | Kidwell |
| 3,513,943 A | 5/1970 | Ernst |
| (Continued) | | |

FOREIGN PATENT DOCUMENTS

| | | | | |
|---|---|---|---|---|
| WO | WO 97/25360 | * | 7/1997 | ............. C08G 18/10 |

OTHER PUBLICATIONS

James V. Quinn, Tissue Adhesives in Wound Care, 1998, B. C. Decker, Inc., Hamilton, Ontario.

(Continued)

*Primary Examiner* — Melvin C Mayes
*Assistant Examiner* — Colette Nguyen
(74) *Attorney, Agent, or Firm* — Owen Bates

(57) ABSTRACT

A tissue filling, repair, sealing, or bonding substance comprising at least three components, at least two of which upon coming into fluid communication with each other react and change the chemical, structural or other properties of the substance so as to bond to adjacent native or implanted tissue. The composition is further defined as comprising a first component of a curable substance, a second component of a suitable curing agent, and a third component of an encapsulant capable of forming a barrier between the first two components and physically arranged to form an encapsulated dispersion of the form interior phase (linking agent), exterior phase (encapsulant), and continuous phase (curable substance). The encapsulant is further defined as having limited solubility in the curable substance and the curing agent and having a melting temperature between 10° C.-50° C.

17 Claims, 4 Drawing Sheets

(51) Int. Cl.
*C09J 189/06* (2006.01)
*C08L 5/04* (2006.01)
*C08L 5/08* (2006.01)
*C08L 89/00* (2006.01)
*C08L 89/06* (2006.01)
*C08J 3/24* (2006.01)

(56) References Cited

U.S. PATENT DOCUMENTS

| | | | | |
|---|---|---|---|---|
| 4,098,736 A | * | 7/1978 | Li et al. | 524/310 |
| 4,722,948 A | | 2/1988 | Sanderson | |
| 5,385,606 A | | 1/1995 | Kowanko | |
| 5,948,427 A | | 9/1999 | Yamamoto | |
| 6,153,236 A | | 11/2000 | Wu | |
| 6,312,725 B1 | | 11/2001 | Wallace | |
| 6,458,375 B1 | | 10/2002 | Gertzman | |
| 2002/0042473 A1 | * | 4/2002 | Trollsas et al. | 525/54.1 |
| 2004/0115459 A1 | * | 6/2004 | Cappi | 428/524 |
| 2004/0235675 A1 | * | 11/2004 | Qiu | 507/200 |
| 2007/0092483 A1 | * | 4/2007 | Pollock | 424/78.27 |

OTHER PUBLICATIONS

J. Sanchez-Sotelo, et. al, Treatment of fractures of the distal radius with a remodellable bone cement, the Journal of Bone & Joint Surgery (Br), 2000, 82-B:856-63.

* cited by examiner

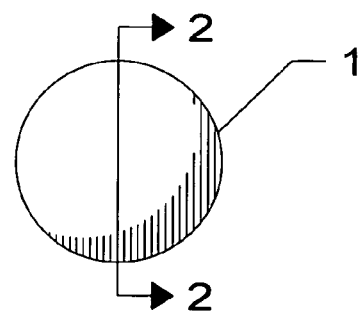
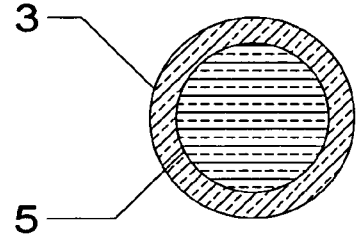
FIG. 1  FIG. 2
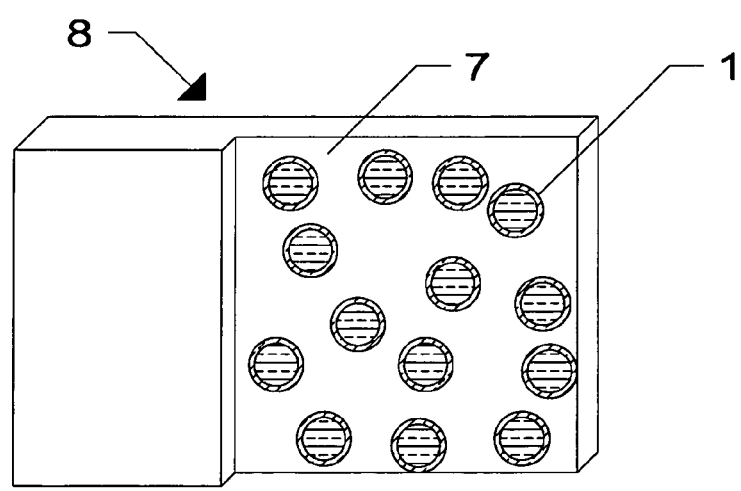
FIG. 3

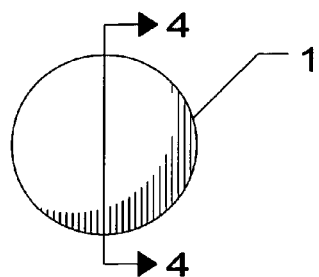
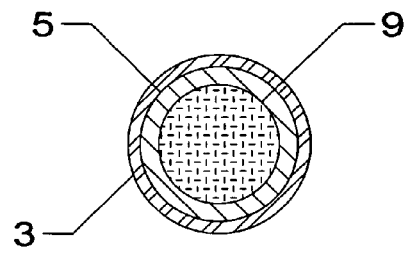
FIG. 7  FIG. 8
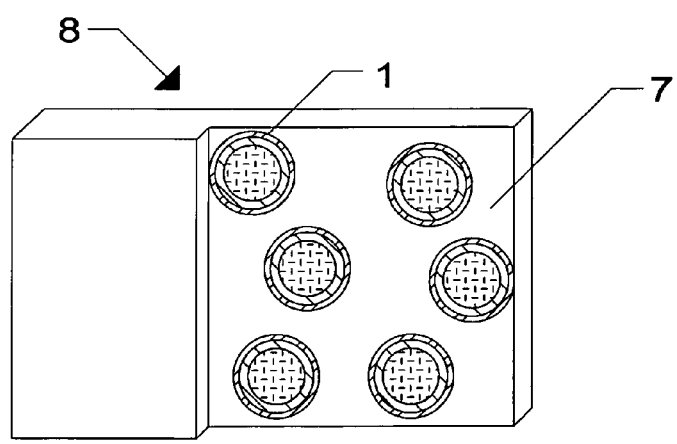
FIG. 9

MULTI-COMPONENT, TEMPERATURE ACTIVATED, TISSUE ADHESIVE, SEALING, AND FILLING COMPOSITION

CROSS-REFERENCE TO RELATED APPLICATIONS

This application is related to Provisional Patent Application No. 61/412,367 and claims priority therein.

STATEMENT REGARDING FEDERALLY SPONSORED RESEARCH OR DEVELOPMENT

No support or compensation has been received for work in support of this invention. The Federally Sponsored Research provision is not applicable.

THE NAMES OF PARTIES TO A JOINT RESEARCH AGREEMENT

None

BACKGROUND OF THE INVENTION

Definitions

As used within this application, the following terms are defined:

Particle—A small subdivision of matter, typically in its solid state but may also be fluid so long as it remains divided.

Curable Substance—A substance capable of being acted upon such that the chemical characteristics undergo polymerization and/or cross-linking.

Curing Agent—A substance capable of effecting a polymerization and/or cross-linking reaction upon a curable substance. The curing agent may be a copolymer in that it becomes an integral moiety of the formed polymer and/or may serve as a catalyst.

Adhesive—As used herein, an adhesive is a liquid or semi-solid substance that adheres or bonds to a substance. The adherence may be through any combination of mechanical, chemical, dispersive, electrostatic, or diffusive effects.

Encapsulant—A substance capable of forming a coating around a particle of a differing substance. Used herein, this may be a pure substance or a composition of substances comprising any combination of surfactants, wetting agents, emulsifiers, and stabilizers.

Decellularized Bone—Any combination of autologous, allograft, and xenograft osseous tissue from which some or all of the cellular substance has been removed.

Demineralized Bone—Any combination of autologous, allograft, or xenograft osseous tissue from which some or all the mineral content has been removed.

Aggregate—A component of the inventive formulation that resists compressive stress and provides bulk. The aggregate units are typically small in comparison to the finished item and may consist of a range of particulate sizes or of relatively uniform particle sizes. As used here, an aggregate would include, but not be limited to, demineralized bone, hydroxyapatite, bioactive glass, and similar substances.

Interior Phase—The core of an encapsulated particle that is surrounded by an encapsulant.

Exterior Phase—The shell of an encapsulated particle, also known as the encapsulant.

Continuous Phase—The substance in which encapsulated particles are embedded or suspended.

Release Condition—The condition under which the encapsulant coating surrounding the interior phase is altered through a change in the physical or chemical environment of the encapsulant such as to allow the interior phase and the continuous phase to come into fluid communication. Such changes in the environment may include but not be limited to temperature, pH, and ionic concentrations.

FIELD OF THE INVENTION

The field of the invention is tissue adhesives, sealants, and fillers, preferably compositions suitable for use within the living body having the property of bonding to native or implanted tissues and adhering through a mechanism of chemical or physical means.

DESCRIPTION OF THE PRIOR ART

A central problem of medical adhesives and sealants is the control of the reactions forming the adhesive or sealant. Adhesives and sealants undergo a reaction from some initial state to some final state. This reaction alters the properties of the substances, resulting in the chemical or mechanical adhesion to adjacent structures. Controlling this reaction is problematic. It must not occur too soon or too easily. Otherwise, the adhesive substance may prove insufficiently stable to manufacture, distribute, store, and dispense. Yet should it occur too late or too slowly, the adhesive properties will be lost as the substance migrates away from the site of application and difficulty will be experienced holding adjacent structures proximate and aligned during the cure.

Numerous strategies have been employed in the prior art to control the onset of adhesive curing. Single component adhesives typically depend upon the presence of a curing agent in the local environment, such as moisture-mediated curing of cyanoacrylates. An alternative is the incorporation of a solvent within the adhesive composition, the curing of which is effected as the solvent diffuses out of the composition. Adhesives have been applied in a molten state. Upon cooling and the concomitant solidification, the adhesive properties are developed. Curing through the application of ultraviolet radiation is also used. With multi-component adhesives, two or more reactive substances are physically segregated, the curing reaction beginning immediately upon mixing and proceeding according to the kinetics of the reactive substances.

Fibrin-thrombin glues offer extremely fast curing, good adhesion to wet tissues, and superior biocompatibility, being naturally present within the body. They, however, suffer from low ultimate bond strength, have historically been costly, and are limited in use due to the necessity of mixing two reactive components in the proper proportions immediately upon application to the wound site.

Cyanoacrylates offer the convenience of a room temperature storable composition, have fast cure times and good strength. As a class they are limited by their curing mechanism which requires moisture recruited from the local environment, and thus limiting them to relatively thin film applications.

Moisture curing synthetics offer improved biocompatibilities, but also suffer from limited application thickness and have relatively long cure times.

Polymethylmethacrylate (PMMA) has remained the default choice for adhesion to osseous tissue for decades. There are several commercialized examples such as Simplex P® and KyphX® and their numerous associated patents. While widely adopted, the necessity to mix the substances immediately prior to implantation, the relative toxicity of the components, and the objectionable heat of polymerization are significant detriments.

A tissue adhesive, composed of two modified polyethylene glycols (PEG), is disclosed in Wallace, et. al (U.S. Pat. No. 6,312,725). An adhesive containing modified polyethylene glycols is marketed by the Baxter corporation under the trade name CoSeal®. This adhesive has enjoyed wide adoption yet is similarly limited in its utility by the necessity of gross physical segregation of its components in separate containers until immediately prior to application.

Micro-particulate tissue adhesives of diverse form and composition are disclosed in Yamamoto, et. al (U.S. Pat. No. 5,948,427). As of the time of this application, none of the described compositions have been successfully commercialized and the patent is now abandoned.

A bone replacement and repair putty is disclosed in Sanderson (U.S. Pat. No. 4,722,948), consisting of Polyester resin, Vinyl Pyrrolidone, Benzoyl Peroxide curing agent, and Calcium Sulfate aggregate.

Naturally derived polymers offer good biocompatibility, low heat generation upon curing, reasonable strength, good wet tissue adherence, and rapid curing. Like all prior art multi-component adhesives, they are limited in their applications by the necessity of mixing during or immediately prior to application.

A tissue adhesive composed of glutaraldehyde and serum albumin is disclosed in Kowanko, (U.S. Pat. No. 5,385,606). A commercial version of this invention is marketed by the CryoLife corporation under the trade name BioGlue®. This adhesive has enjoyed wide adoption within the cardiac surgery field, yet is limited by the immediate onset of polymerization of the components, relying upon physical segregation of those components in separate containers until immediately prior to application.

An osseous tissue defect filling paste is disclosed in Gertzman, et. al (U.S. Pat. No. 6,458,375). This composition is less an adhesive than a filling composition and shares with other bone fillers a limited adhesion and resistance to post-implant migration.

An adhesive mixture containing an encapsulated curing agent suspended within a liquid polymerization substance is disclosed in Kidwell, et. al (U.S. Pat. No. 3,505,428). The encapsulated curing agent, however, is in a solid state and the encapsulant substance itself has no mention of heat sensitive properties. The mechanism of activation of the mixture is unclear, yet the encapsulated curing agent appears to require high pressure or mechanical shear to fracture the coating and allow the reaction to take place. The substances and applications disclosed are also by no means biocompatible nor is it the stated intent to use the substance within a living organism.

Each of these methods has limitations and drawbacks, where it is the aim of this invention to remedy.

BRIEF SUMMARY OF THE INVENTION

The present invention entails a novel arrangement of matter comprising two or more components in admixture. At least two of the components will, when in fluid communication, undergo a reaction, the result of which is a change in the chemical, structural, or other properties of the starting substances. At least one of the reactive substances is isolated from fluid communication with the remaining substances by the presence of a third component, a coating or encapsulating substance. The properties of this encapsulant substance are selected such that the reactive substances remain in fluid isolation and un-reacted until predefined release conditions occur.

The present invention is further defined to be a method of manufacture and the resulting compositions wherein the physical separation of the components is an integral part of the function of the composition. As stated above, the invention consists of at least two reactive components. At least one of these components is encapsulated in the language of the art by a third component, chosen to be non-reactive with the first two components and of limited solubility in the first two components. The arrangement will form a composition of matter of the form interior phase (or core), exterior phase (or shell), and continuous phase.

By means of this artifice, a multitude of controlled activation, biocompatible tissue adhesives and sealants may be formed with greatly expanded utility when compared to those currently available in the art.

BRIEF DESCRIPTION OF THE SEVERAL VIEWS OF THE DRAWING

Features of the invention, its nature and various advantages will be apparent from the accompanying drawings and the following detailed description of various embodiments, in which:

FIG. 1—A plan view of the encapsulated curing agent particle;

FIG. 2—A sectional view of the encapsulated particle revealing the internal composition as the core or interior phase and the shell or exterior phase;

FIG. 3—A view of a quantity of the composition, a portion of which has been cut away, revealing the mixture of continuous phase and encapsulated particles;

FIG. 7—A plan view of an alternate encapsulated curing agent particle, comprising aggregate within the encapsulant;

FIG. 8—A sectional view of an alternate encapsulated curing agent particle, comprising aggregate within the encapsulant; and FIG. 9—A view of an alternate composition with aggregate reinforcement, a portion of the composition having been cut away revealing the mixture of encapsulated particles and continuous phase.

DETAILED DESCRIPTION OF THE INVENTION

Figure 4:
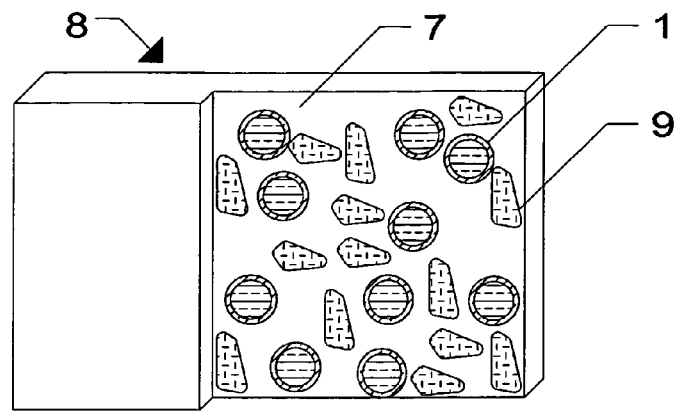
FIG. 4—A view of an alternate composition with aggregate reinforcement, a portion of the composition having been cut away revealing the mixture of encapsulated particles, continuous phase, and an admixture of reinforcing substance.

The damage or degradation of osseous tissue is a common occurrence, which as yet has no ideal method of repair. The preferred method continues to be surgical procedure and mechanical fixation with reinforcement of the compromised tissue to provide support and positional stability until the bodies' natural repair mechanism can rebuild the damaged bone. This mechanical fixation typically involves screws, pins, or plates. Where a deficit of healthy bone exists, a patient's own tissue may be harvested and re-implanted, or other bone substitutes, such as decellularized bone, bioactive glass, minerals such as hydroxyapatite, or synthetic polymers may be employed. Adhesives and cements may augment or replace the above methods and substances.

A first area of the invention is the bonding, sealing, and filling of osseous tissue.

Another area of the invention is in the application, by fluid sprinkling, spraying, or dispersal, of a biocompatible sealant film. Numerous instances are known, such as the repair of dura mater following injury or surgical procedure, whereby a substance capable of adhering to native tissue and forming a sealant layer would be advantageous.

Another area of the invention is that of wound closure, an area currently dominated by sutures and staples.

Other applications of the present invention will be evident to those skilled in the art. All such applications are hereby reserved and claimed within the scope of the invention.

DESCRIPTION OF THE INVENTION

A tissue filling, repair, sealing, or bonding substance comprising a composition having at least three components, at least two of which are held in fluid isolation until predefined release conditions are attained, whereupon the two components are released into fluid communication and react changing the physical properties of the composition so as to bond to adjacent tissue. The composition is further defined as comprising a first component of a curable substance, a second component of a suitable curing agent, and a third component of an encapsulant capable of forming a barrier between the first two components and physically arranged to form a composition comprising an interior phase (curing agent), an exterior phase (encapsulant), and a continuous phase (curable substance). The encapsulant is further defined as having limited solubility (<50 g/liter at storage conditions) in the curable substance and the curing agent and having a melting temperature between 10° C.-50° C. Curing of the composition is induced by an input of thermal energy such as warming from a refrigerated state to at or near mammalian body temperature.

Encapsulating the curing agent instead of the curable substance provides several advantages. Curing agents tend, as a category, to be more chemically reactive than the associated curable substances. By isolating them within an encapsulant shell, and further enclosing the encapsulated particles within the continuous phase of the curable material, contact between the living tissue of the host organism and the curing agent is reduced from what it might otherwise be.

Curing agents also tend to be more reactive to other components of the composition and more subject to degradation. Encapsulation of the curing agent serves to render the composition more stable and with a longer shelf life. Finally, curing agents typically comprise a smaller fraction of the overall composition than do the associated curable substances. By encapsulating the smaller volume curing agent, the fraction of the composition which must be taken up by the encapsulant is reduced.

The composition will optionally include additional beneficial substances such as structural adjuncts, medicaments, healing factors, or other substances as needed for the intended use. It is envisioned that the additional substances may be disposed within the interior phase, the continuous phase, or both as best suites the application.

Various forms of the invention are envisioned to have differing viscosities. Use of viscosity modifiers is well known in the pharmaceutical industry.

One embodiment of the composition 8 is shown in FIGS. 1-3, wherein the composition is comprised of the curing agent as particles (the interior phase) 5, the encapsulant coating the particles (the exterior phase) 3, and the coated particles 1 mixed within the curable substance (the continuous phase) 7.

EMBODIMENTS

The following embodiments serve to further illustrate the present invention but are not meant in any way to limit or restrict the effective scope of the invention.

An embodiment of the present invention (Embodiment #1) is a composition comprising, as a mixture, a curable substance, for example bovine serum albumin (BSA), human serum albumin (HSA), or ovalbumin in aqueous solution; a curing agent, for example a di- or poly-aldehyde in aqueous solution; and an encapsulant substance formed into a continuous shell around particles of the curing agent. The encapsulant is chosen such that it maintains the curable substance and the curing agent in fluid isolation under specific conditions. However, the encapsulant melts, dissolves, or ruptures under differing conditions allowing the protein and curing agent solutions to enter into fluid communication.

Figure 6:
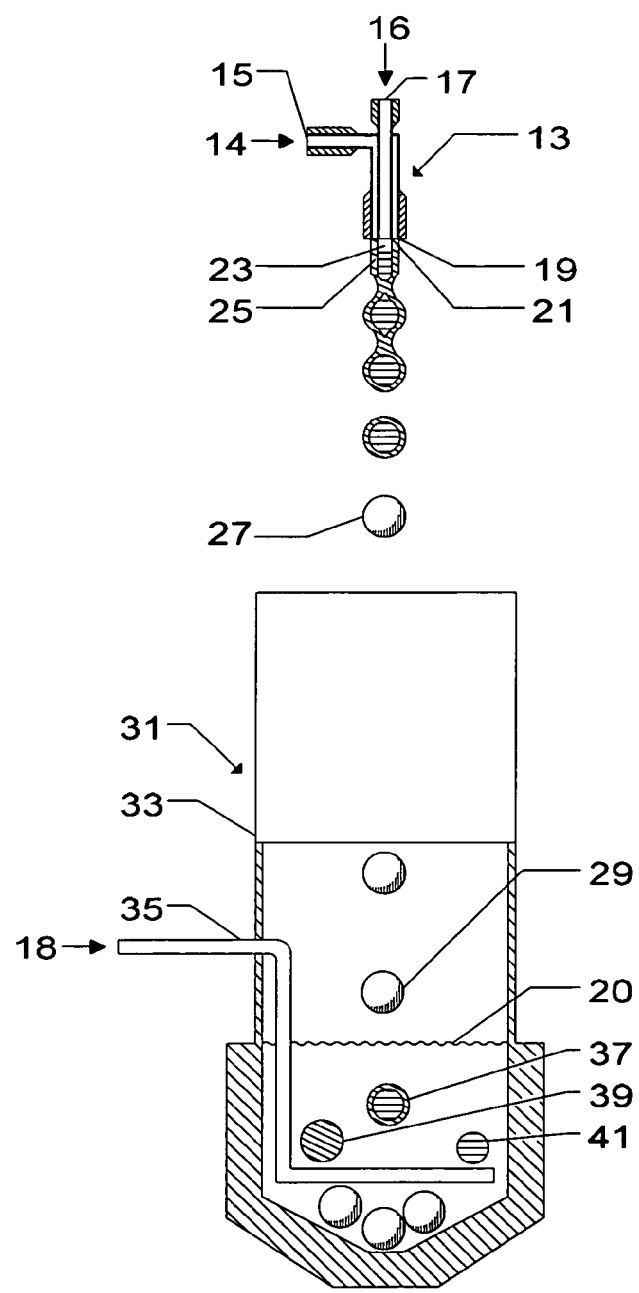
FIG. 6—A view of a preferred apparatus and method of manufacture of the encapsulated particles.

One suitable method of manufacture of the preferred embodiment is described below and illustrated in FIG. 6.

The envisioned best method of production is through stationary co-extrusion, the principle of which is to dispense two liquid substances simultaneously though concentric nozzles, one liquid stream being enclosed within the second stream. As the liquid streams propagate, instabilities result in the formation of discrete droplets. The droplets consist of an inner core substance surrounded by a liquid shell of encapsulant. The encapsulant shell is then caused to solidify.

Process inputs: core liquid 16;
encapsulant 14; and
gaseous nitrogen 18.

The production apparatus consists of a concentric nozzle assembly 13 comprising an inner nozzle 21 and an outer nozzle 19. The droplet stream is directed downwards into a drop tube assembly 31, at the bottom of which is a bath of liquid nitrogen 20 and a sparge tube 35 for the introduction of gaseous Nitrogen 18.

The core liquid 16 is introduced at the core inlet 17 of the concentric nozzle assembly 13 where it is discharged from the inner nozzle 21 as a liquid jet 23. Simultaneously, the encapsulant liquid 14 is introduced at the encapsulant inlet 15 of the concentric nozzle assembly 13 where it is discharged from the outer nozzle 19 as a liquid jet 25 enclosing the core jet 23.

Instabilities in the liquid jet cause the formation of a stream of free-falling droplets 27. The droplets enter the top of the drop tube assembly 31, the interior of which is filled with an upwardly flowing cryogenic gas generated by the introduction of gaseous Nitrogen 18 through the sparge tube 35 into the bath of liquid nitrogen 20. As the droplets 27 fall through the cryogenic gas inside the drop tube, the outer shell substance hardens forming spherical encapsulated particles 29. The partially solidified spheres plunge into the bath of liquid nitrogen 20 forming completely solidified sphere 37. Because the density of the liquid nitrogen 20 is less than that of the completely solidified spheres 37, the finished particles collect in the bottom of the bath.

Improperly formed particles of only coating substance 39 and only uncoated core substance 41 will be present as defect substance and will be removed in subsequent processing.

The introduction of gaseous nitrogen 18 into the bath of liquid nitrogen 20 resulting in an upwardly flowing cryogenic gas column serves to solidify the falling droplets 27 as well as to slow the transit time of the particles through the drop tube and thus effectively lengthen the drop tube. The generation of a column of upwardly flowing cryogenic gas by introduction of gaseous nitrogen into a bath of liquid nitrogen is an improvement over the previous known art and is hereby claimed within the scope of the invention.

The solidified encapsulated particles are recovered from the bath of liquid nitrogen 20 and maintained in a frozen state.

The particles are mixed into a volume of liquid albumin solution which has been cooled below the melt temperature of the encapsulant. The resulting base composition is maintained at 2-20° C. which maintains the exterior phase in the solid state and the interior and continuous phases in the liquid state.

A proof of concept experiment was performed using the apparatus and method described. An aqueous core with indicator dye was encapsulated within liquefied coconut oil into the drop tube assembly, the layer of cryogenic gas, and the liquid nitrogen bath. The solidified particles were recovered and allowed to warm to refrigerated temperatures (between 2-20° C.), above the melting temperature of the aqueous core, but below the melting temperature of the encapsulant. Properly encapsulated cores were removed from uncoated core substance by straining. Properly encapsulated particles were separated from solidified particles of coating substance through visual inspection, the dyed core being visible within the coating. The encapsulated particles were subsequently warmed to human body temperature, the coating melted, and the core substance was released.

It will be evident to those skilled in the art that numerous alternative methods of manufacturing are also applicable. In addition to co-extrusion, other procedures such as pan coating of solid particles, fluidized bed coating of solid particles, centrifugal co-extrusion, ultrasonic encapsulation, or coacervation may be utilized.

Similarly, a wide range of multi-component biocompatible adhesives may be the subject of this invention. The essence of the invention is the encapsulation of one or more components within a temperature responsive substance and forming an admixture of the encapsulated particles within the remaining components of the composition.

To the encapsulated particles and the continuous phase, reinforcing substances may optionally be incorporated. Such reinforcing substances comprise natural or synthetic calcium compounds, glass, bone, collagen, metals, ceramics, and polymers. The reinforcing substance comprises fibers, aggregate, and porous solids. The invention is also envisioned to comprise any combination of colorants, preservatives, surfactants, anti-microbials, viscosity modifiers, plasticizers, hardeners, viscosity modifiers, growth promoters, stabilizers, sequestrants, and radio-contrast agents.

It is anticipated that in applications involving use of the composition for implantation within living organisms, suitable packaging and sterilization processing will be performed.

A preferred method of packaging is to place the composition within a multi-layer heat-sealable pouch, seal the pouch, place the composition and inner pouch within an outer multi-layer heat-sealable pouch, and seal the outer pouch. The double-pouched composition will then be submitted to sterilization processing by gamma irradiation, e-beam sterilization, or other such methods to be developed. It is anticipated that the composition will be refrigerated or frozen during the sterilization processing so as to avert premature activation of the composition.

Embodiment #2

Another embodiment of the present invention is a composition comprising a mixture of the following:

a. a polysaccharide, for example an alginate, in aqueous solution;

b. a curing agent, for example calcium chloride, in aqueous solution; and c. an encapsulant substance, for example a lipid, formed into a continuous shell around particles of the curing agent.

The lipid encapsulant maintains the polysaccharide and curing agent in fluid isolation under refrigerated or room storage temperatures yet will melt at physiologic temperatures allowing the polysaccharide and curing agent solutions to enter into fluid communication.

Embodiment #3

Another embodiment of the present invention is a composition comprising a mixture of the following:

a. a polysaccharide, for example chitosan, in aqueous solution;

b. a curing agent, for example tripolyphosphate, in aqueous solution; and c. an encapsulant substance, for example a lipid, formed into a continuous shell around particles of the curing agent.

The lipid encapsulant maintains the polysaccharide and curing agent in fluid isolation under refrigerated or room storage temperatures yet will melt at physiologic temperatures allowing the polysaccharide and curing agent solutions to enter into fluid communication.

Embodiment #4

Another embodiment is a composition as described in Embodiment #2, which would optionally include viscosity modifying agents as is otherwise common in the industry so as to render the composition into a fluid with a viscosity of 0.2-100,000 centipoises at its storage and application temperatures.

Embodiment #5

Another embodiment is a composition as described in Embodiment #2, further comprising de-cellularized bone and viscosity modifying agents so as to render the composition into a plastic semi-solid, paste, or putty at its storage and application temperatures. This embodiment is shown in simplified form in FIG. 4: To the composition 8 comprising encapsulated particles 1 mixed within the continuous phase 7 is added decellularized bone aggregate 9.

To prepare Embodiment #5:

a. A composition of aqueous calcium chloride particles, encapsulated within a lipid shell and formed in admixture with an aqueous alginate in the form interior phase, exterior phase, continuous phase is prepared.

b. While maintaining the resulting composition below the encapsulant melting temperature, yet above the alginate freezing temperature, a measured quantity of decellularized bone aggregate is added and mixed until dispersed.

c. Viscosity modifying agents are added to render the composition into a plastic consistency similar to modeling clay, allowing a surgeon to mold, cut, or add substance easily as needed to obtain a desired shape and size.

Suitable packaging and sterilization processing will be performed on the composition as part of the manufacturing procedure.

A sample implantation workflow is described:

a. The substance is held in refrigerated storage until required for use. The storage conditions are such as to maintain the encapsulant in a solid state, thereby maintaining the reactive components in non-adhesive fluid isolation.

b. Immediately prior to implantation, a suitably sized and/or shaped piece of substance is removed from refrigerated storage and removed from its protective packaging.

c. The substance is molded, cut, or added to so as to obtain the desired shape and size to be implanted into the patient's osseous tissue.

Note: Pre-implantation preparation is to be performed expeditiously so as to prevent the substance from warming above the encapsulant melting temperature. Means may be taken to extend this working time such as performing the preparation within a refrigerated environment or by applying cooling treatments to the substance.

d. The substance is implanted into the patient by methods known to those skilled in the art (i.e. orthopedic surgery).

e. As the substance warms to the patient's body temperature, the encapsulant substance passes through its melting temperature of 10° C.-50° C., transitioning from the solid to the liquid state. The reactive components will now be in fluid communication. The curing reaction will modify the structure of the polysaccharide substance into a form capable of resisting shear forces, adhering to the patient's osseous tissue, and holding the particles of reinforcing substance at the site of implantation.

f. The solidified substance will adhere to the patient's osseous tissue. The repair matrix, by its property of being plastic and having been fitted to the osseous tissue will bond mechanically with that tissue.

g. Repair of the patient's osseous tissue and completion of the surgical procedure will proceed by methods known to those skilled in the art.

It is anticipated that shaping of the composition in its non-reacted form into morphologies approximating human bone would be of use to the implanting surgeon and is hereby included within the scope of the invention.

Embodiment #6

Another embodiment is a composition as described in Embodiment #5, further comprising any combination of synthetic polymers, hydroxyapatite, and bioactive glass as adjuncts. This embodiment is shown in simplified form in FIGS. 8 and 9: FIG. 8 shows an encapsulated particle 1 of curing agent 5, comprising a particle of solid aggregate 9 within the encapsulant 3. FIG. 9 shows the encapsulated particles 1 within the curable substance 7.

Such an embodiment is envisioned to be effective where the structural adjunct, such as bioactive glass of hydroxyapatite, itself acts as a curing agent for the curable substance, such as Alginate.

Embodiment #7

Another embodiment is a composition as described in Embodiment #6, further comprising a radio contrast agent. The addition of a radio contrast agent serves to allow ready imaging of the implanted substance to ensure proper placement and to monitor tissue in-growth, remodeling, and degradation of the implant over time.

Embodiment #8

Another embodiment is a composition as described in Embodiment #3, further comprising viscosity modifying agents so as to render the composition into a plastic semi-solid with a viscosity greater than 100,000 centipoises.

Embodiment #9

Another embodiment is a composition as described in Embodiment #8, further comprising viscosity modifying agents so as to render the composition a suitable viscosity and hardness for the coating of implantable screws or pins.

Embodiment #10

Another embodiment is a composition as described in Embodiment #3, further comprising such additional components and processing as to render it into a sheet, strip, patch, ring, or plug of plastic substance.

This embodiment is foreseen to function as a wound closure or dressing substance, being formed into a sheet or strip with such suitable protective packaging as to allow it to be presented to the site of injury in a sterile manner and facilitating application to the wound. The warmth of the tissue activates the curing of the substance and effecting the adhesive bond with the adjacent tissue.

Embodiment #11

Figure 5:
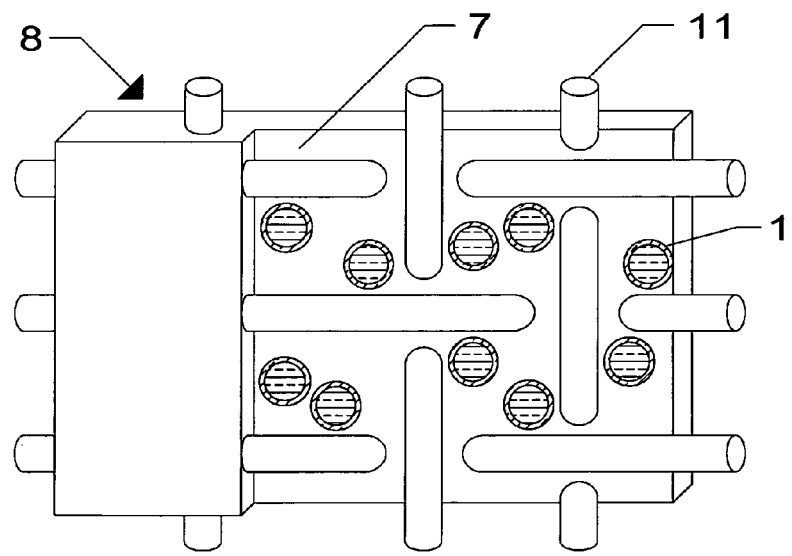
FIG. 5—A view of an alternate composition with fibrous reinforcement, a portion of the composition having been cut away revealing the mixture of encapsulated particles, continuous phase, and reinforcing fibrous substance.

Another embodiment is a composition as described in Embodiment #10, further comprising fibers shown in FIG. 5. Fiber reinforcement 11 is added to the composition 8 comprising encapsulated particles 1 mixed within the continuous phase 7.

This embodiment is foreseen to function as a wound closure or dressing substance by being formed into a sheet or strip. It is manufactured with such suitable protective packaging as to allow it to be presented to the site of injury in a sterile manner and facilitating application to the wound in a therapeutically efficacious manner. The warmth of the tissue will subsequently activate the curing of the substance and effecting the bond with the adjacent tissue. Fiber reinforcement is a useful enhancement to increase the composition's tensile strength.

Embodiment #12

Another embodiment is a composition as described in Embodiment #3, further comprising such additional components as to render it suitable for the coating of implantable trans-cutaneous tubing, the curing of the substance serving to bond the implant in place and provide a microbe resistant barrier. Such an embodiment is anticipated to be used in applications such as Peripherally Inserted Central Catheters (PICC).

Embodiment #13

Another embodiment is a composition as described in Embodiment #3, further defined as of a suitable viscosity and encapsulated particle size as to allow dispensing through means of a spray or aerosol apparatus.

By such means, a layer of relatively uniform coverage and controllable thickness is deposited upon the target tissues, the warmth of which initiates the curing of the substance. Such a substance could see use in applications such as the repair of dura matter.

Embodiment #14

Another embodiment is a composition as described in Embodiment #1, wherein the curable substance is collagen. The collagen may be derived from suitable animal sources.

Embodiment #15

Another embodiment is a composition as described in Embodiment #1, wherein the curable substance is glycerin.

Embodiment #16

Another embodiment is a composition as described in Embodiment #1, wherein the curable substance is fibrinogen, and the curing agent is thrombin.

Embodiment #17

Another embodiment is a composition as described in Embodiment #1, wherein the encapsulant comprises coconut oil.

Embodiment #18

Another embodiment is a composition as described in Embodiment #1, wherein the encapsulant comprises theobroma oil.

Although the present invention has been described with reference to specific examples, it should be understood that various modifications and variations can be easily made by a person having ordinary skill in the art without departing from the spirit and scope of the invention. Accordingly, the foregoing disclosure should be interpreted as illustrative only and not to be interpreted in a limiting sense. The present invention is limited only by the scope of the following claims.

We claim:

1. A bio-compatible composition comprising:
   a curable substance;
   curing agent as particles; and
   a lipid encapsulant, which coats the particles of the curing agent;
   said encapsulant having limited solubility in the curing agent and limited solubility in the curable substance;
   wherein:
   the particles of the curing agent are disposed within the curable substance;
   the curing agent is held in fluid isolation from the curable substance by the encapsulant;
   the curable substance and the curing agent, when in fluid communication with each other, undergo a reaction; and
   the encapsulant, when subjected to a temperature between about 10° C. and about 37° C., releases the curing agent thus allowing the curing agent and the curable substance to come into fluid communication with each other.

2. The composition according to claim 1, wherein the curable substance comprises a protein.

3. The composition according to claim 2, wherein the curable substance comprises albumin.

4. The composition according to claim 1, wherein the curable substance comprises collagen.

5. The composition according to claim 1, wherein the curable substance comprises glycerin.

6. The composition according to claim 1, wherein the curable substance comprises a polysaccharide.

7. The composition according to claim 6, wherein the polysaccharide curable substance comprises an alginate.

8. The composition according to claim 6, wherein the polysaccharide curable substance comprises chitosan.

9. The composition according to claim 1, further comprising an additional substance selected from the group consisting of hydroxyapatite, demineralized bone, bone, bioactive glass and plastic.

10. The composition according to claim 9, further comprising a radio contrast agent.

11. The composition according to claim 1, wherein the composition is a moldable semi-solid.

12. The composition according to claim 11, wherein the composition is configured into a form approximating the shape of a human bone in part or total.

13. The composition according to claim 11, wherein the composition is configured into a form selected from the group consisting of a strip, a sheet, a patch, a ring and a plug.

14. The composition according to claim 13 further comprising structural fibers.

15. The composition according to claim 1, wherein the curable substance comprises fibrinogen and the curing agent comprises thrombin.

16. The composition according to claim 1 wherein the lipid encapsulant material is selected from the group consisting of coconut oil and theobroma oil.

17. The composition according to claim 1 wherein the composition is heat sealed within at least two layers of a heat sealable pouch, which is then frozen, and subjected to a sterilizing dose of gamma or e-beam radiation.

\* \* \* \* \*